W. R. MACKLIND.
CENTRIFUGAL SEPARATOR.
APPLICATION FILED APR. 8, 1909.

949,488.

Patented Feb. 15, 1910.

5 SHEETS—SHEET 1.

W. R. MACKLIND.
CENTRIFUGAL SEPARATOR.
APPLICATION FILED APR. 8, 1909.

949,488.

Patented Feb. 15, 1910.

5 SHEETS—SHEET 2.

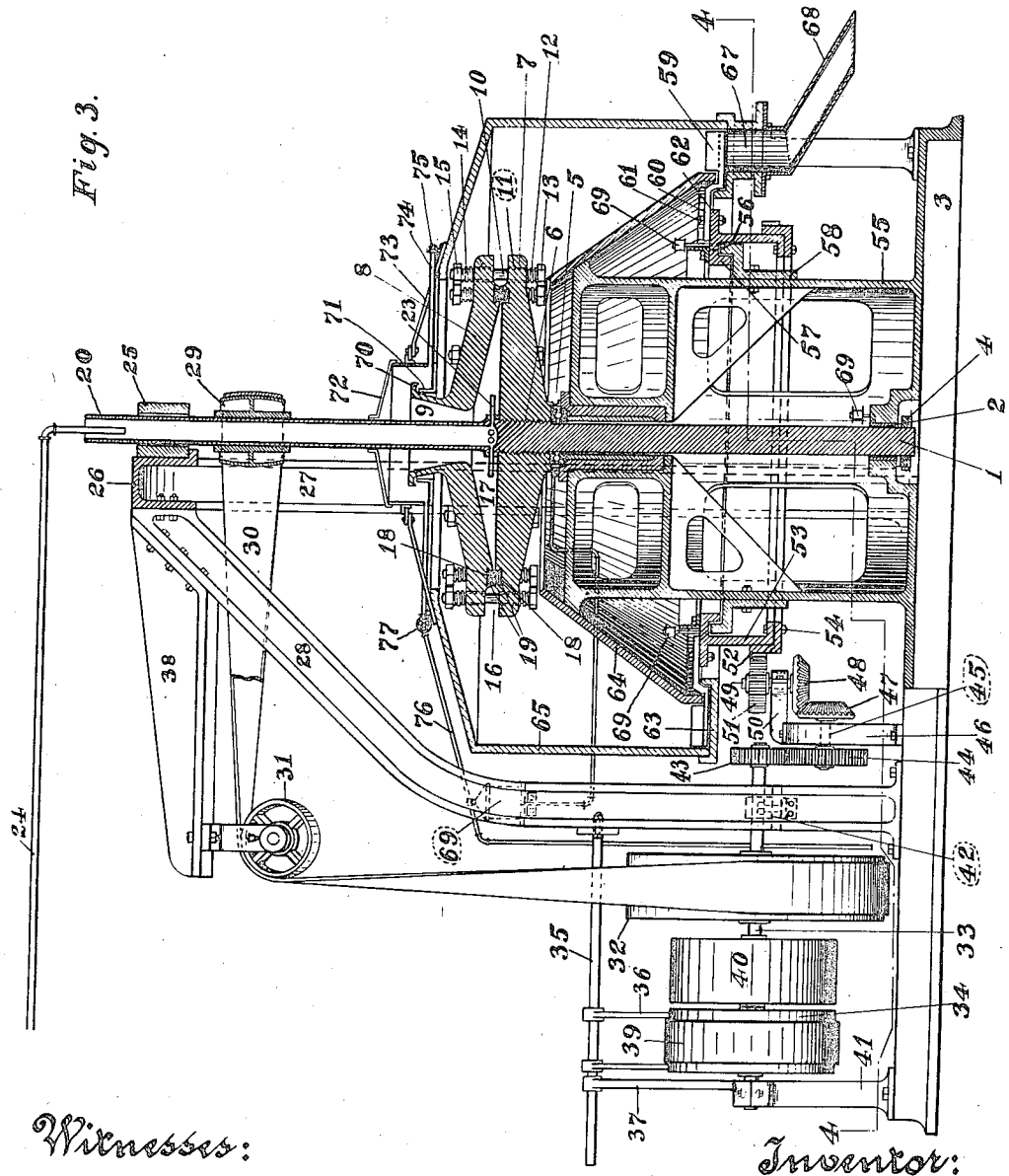

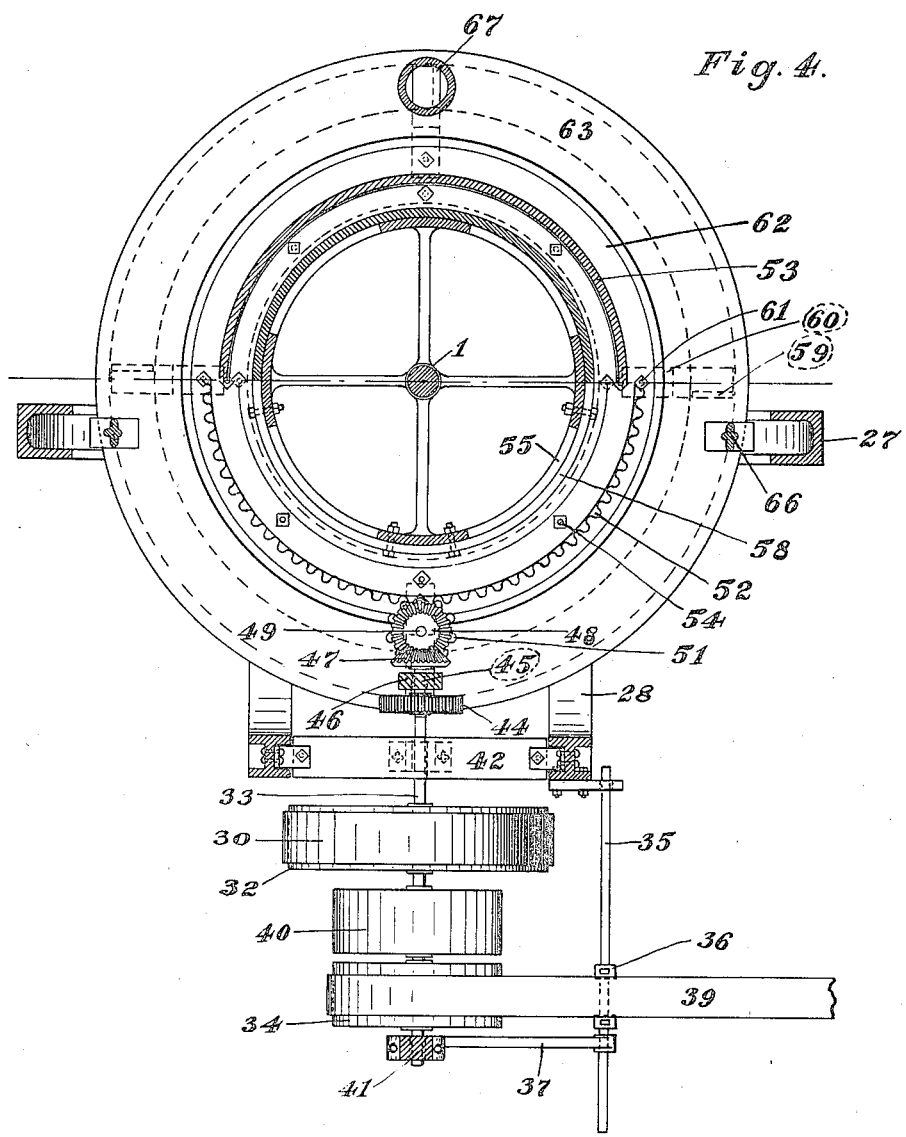

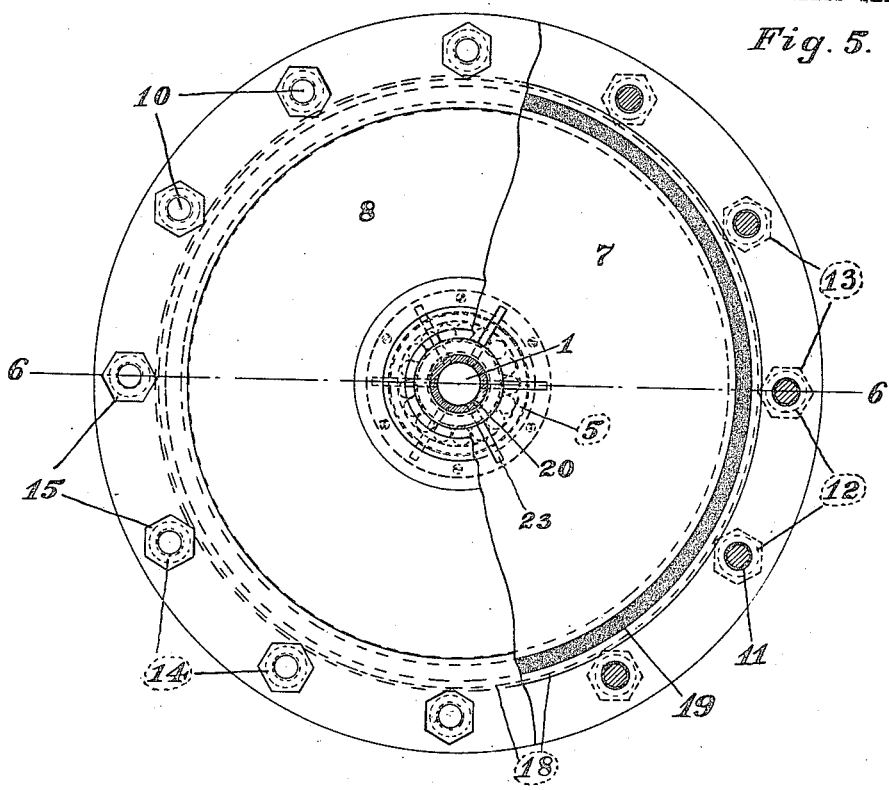
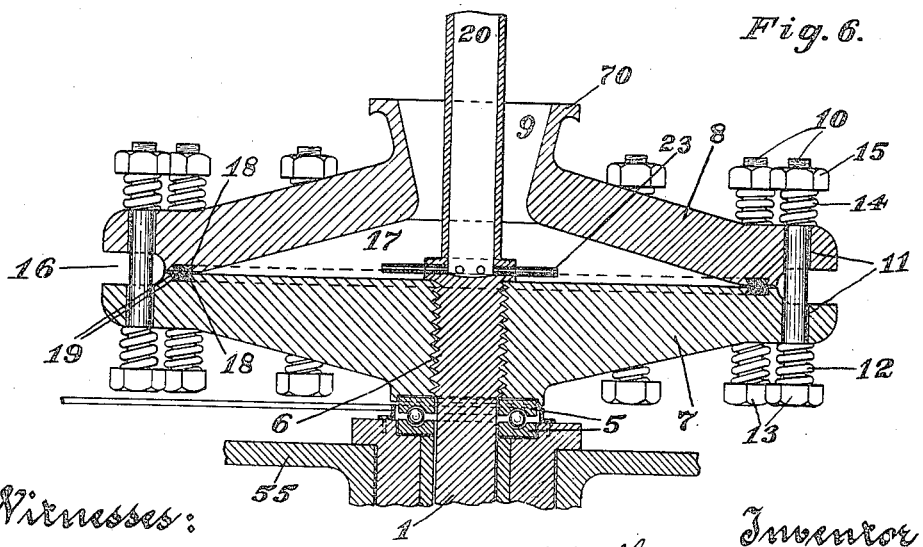

UNITED STATES PATENT OFFICE.

WILLIAM R. MACKLIND, OF MINERAL POINT, MISSOURI.

CENTRIFUGAL SEPARATOR.

949,488.

Specification of Letters Patent.   Patented Feb. 15, 1910.

Application filed April 8, 1909.   Serial No. 488,564.

*To all whom it may concern:*

Be it known that I, WILLIAM R. MACKLIND, a citizen of the United States, residing at Mineral Point, in the county of Washington and State of Missouri, have invented certain new and useful Improvements in Centrifugal Separators, of which the following is a specification, reference being had therein to the accompanying drawings.

This invention consists in improvements in centrifugal separators, and resides particularly in the provision of a peripheral discharge therefor.

Figure 1:
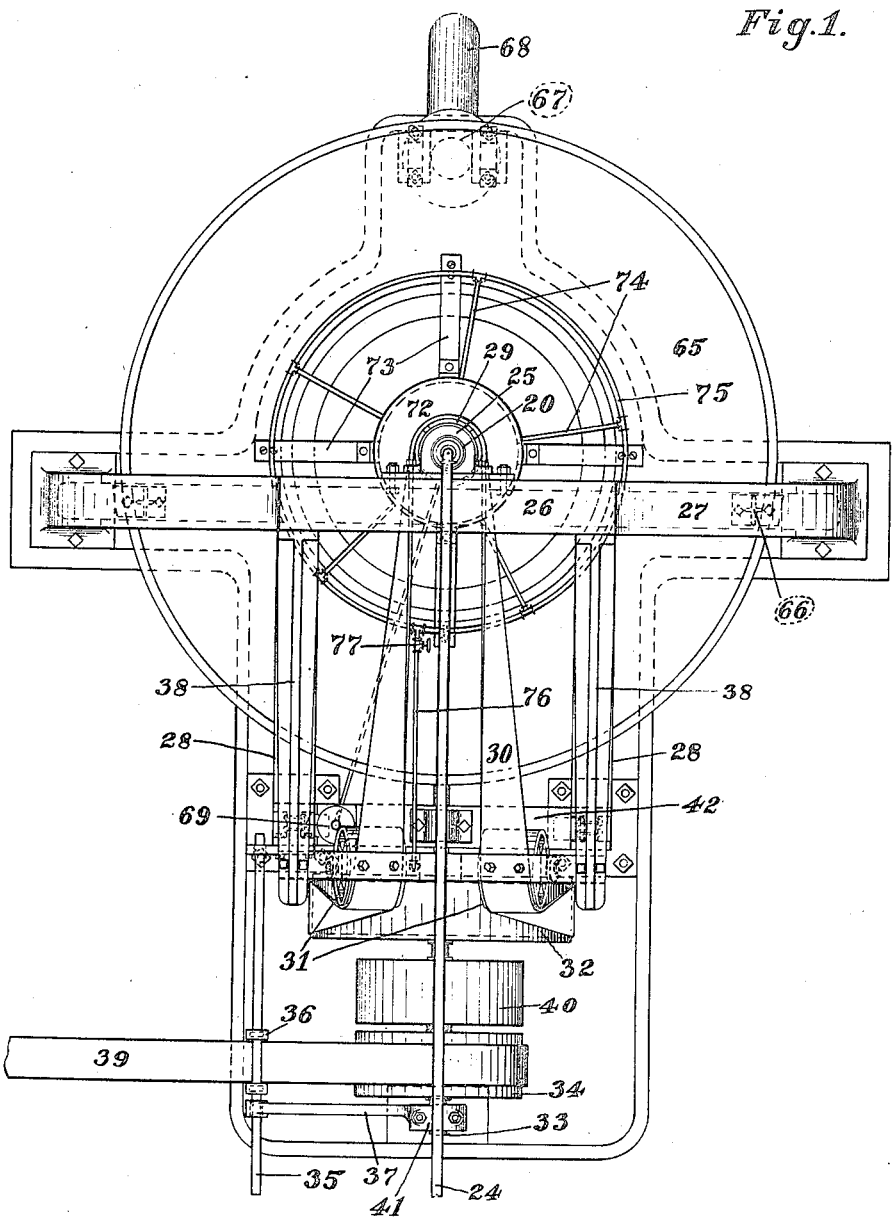
Figure 2:
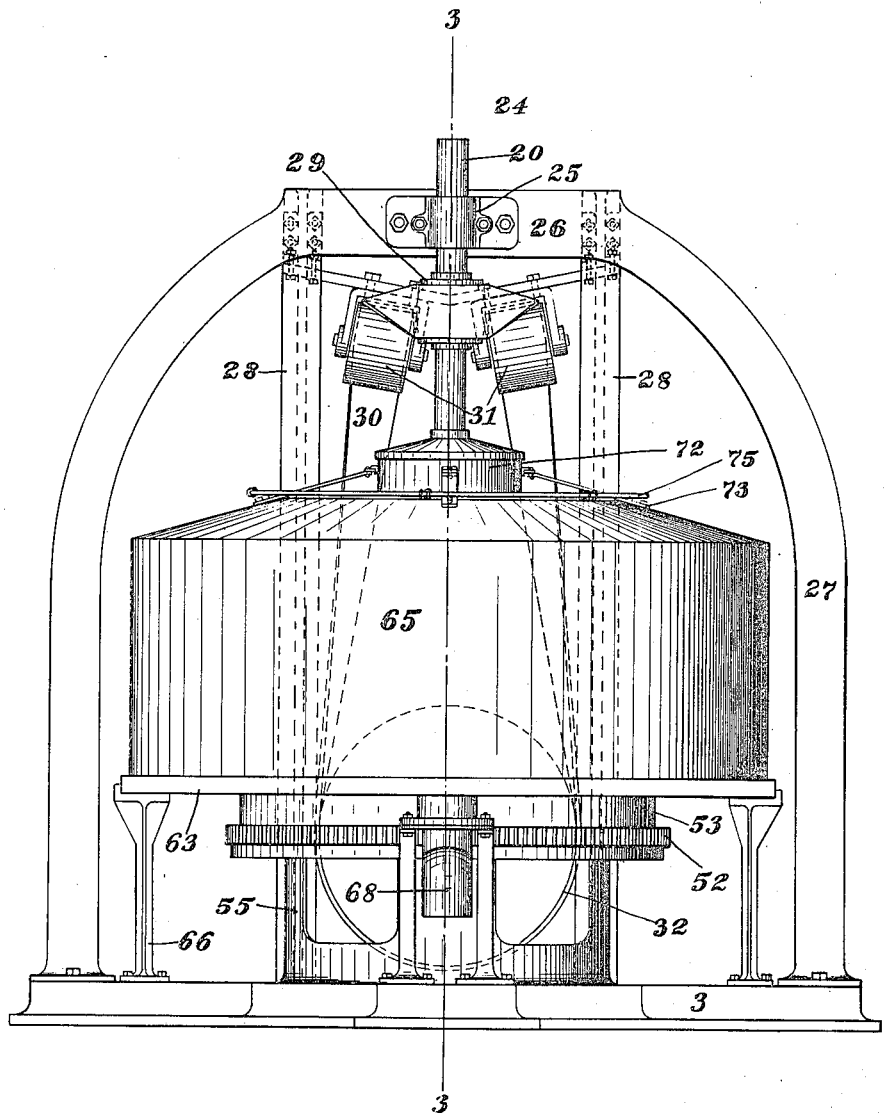

In the drawings, like numbers of reference denote like parts wherever they occur, and Figure 1 is a top plan view; Fig. 2 is an end elevation; Fig. 3 is a sectional view on the line 3—3, Fig. 2; Fig. 4 is a sectional view on the line 4—4, Fig. 3; Fig. 5 is a top plan view of the centrifugal chamber, part of the upper shell being broken away; and Fig. 6 is a transverse sectional view on the line 6—6, Fig. 5.

The shaft 1 is journaled at 2 in the base casting 3, and is prevented from rising by collar 4. At its upper end, said shaft is journaled in ball-bearing collar 5, and adjacent thereto is threaded at 6 to receive the lower disk or shell 7 of the centrifugal chamber or receiver, said disk 7 being thus adapted to rotate with shaft 1. The companion disk or shell 8, which is preferably somewhat concaved and contains an opening 9, is fastened to disk 7 by bolts 10, which pass through perforations 11 in both disks, springs 12 located between the heads 13 of said bolts and one of the disks and springs 14 located between nuts 15 and the other of said disks tending to press said disks together, but in an adjustable relation. The disks 7 and 8, as is apparent from inspection of Fig. 1, form a long tapering circular wedge, the disk 7 being preferably flat as compared to the substantially shallow concavity of disk 8. It is further to be observed that the greatest distance between the disks 7 and 8 is exceedingly small as compared with the diameters of the disks. The outer edge of each of said disks is circumferentially notched or recessed, whereby a peripheral groove 16 extending entirely around the centrifugal chamber is provided. Said peripheral groove forms a flaring mouth for the exit, under centrifugal propulsion, of material from centrifugal chamber 17. Somewhat more to the center of said disks 7 and 8 than the inner edge of the recesses forming the peripheral groove 16, grooves 18 in disks 7 and 8 are provided to receive annuluses 19 formed of rubber or other suitable resilient material. The upper and the lower annuluses, registering with each other, form a joint between the two disks impenetrable for liquid and much tighter and closer than would be possible if the touching parts were formed of metal. Hollow shaft or pipe 20 is preferably an integral continuation from the top of shaft 1, one end of shaft 1 being bored to form same. A plurality of branch pipes 23 radiate out from pipe 20, and cause the fluid material that enters pipe 20 from pipe 24 (leading from any suitable reservoir) to flow away from the center of chamber 17. As pipe 20 is integral with shaft 1 so as to rotate therewith, the fluid material is emitted from branch pipes 23 with some force and ejected therefrom in the direction of the opening that forms between the disks 7 and 8 adjacent to peripheral groove 16. Pipe 20 passes through opening 9 in the shell 8, and in its upper end is journaled in sleeve 25 borne by the cross-piece 26 of the main frame 27 of the machine, said frame being supported by braces 28.

The pulley 29 is fixed to pipe 20, and is driven by belt 30, which passes over idlers 31, and is, in turn, driven by band-wheel 32 mounted on shaft 33, which receives its power from pulley 34. Rod 35, which supports the band-shifter 36, is held in place by one of the braces 28 and upright 37. The idlers 31 are supported by arms 38, which project from the braces 28. As will be readily understood, the belt-shifter 36 is used to shift belt 39 from the tight pulley 34 to the loose one 40. Shaft 33 is journaled at one end in standard 41, and at the other in cross-piece 42, which extends from one brace 28 to the other. Pinion 43, driven by said shaft 33, engages gear 44 mounted on shaft 45 supported by standard 46. Beveled gear 47 is, also, mounted on said shaft 45, and drives beveled gear 48 mounted on shaft 49 supported by bracket 50 extending from standard 46. Spur gear 51 is mounted on shaft 49 and actuated thereby, and engages a circumferential rack 52, which extends entirely around casing 53. Said rack is fastened to casing 53 by bolts 54, said rack being on the exterior face of a circular angle-iron. Casing 53 is adapted to rotate around the central drum 55, said casing 53 having an overhanging flange 56 and lip 57 by which it is hung upon circular bracket 58 rigidly fastened to the central drum 55.

A plurality of scrapers 59 project from casing 53, each arm 60 of each scraper 59 being fastened by bolt 61, or by other suitable means, to flange 62 projecting from casing 53. As, therefore, casing 53 rotates, the scrapers 59 likewise move circumferentially, and carry with them any material that has fallen upon floor 63, having been conveyed thereto by the bell 64 and wall 65, which form the receiving chamber into which the solid matter ejected from the peripheral groove 16 falls after having been separated in chamber 17 by centrifugal motion from the liquid with which it was combined when ejected from branch pipes 23 which gave it entrance to chamber 17 from pipe 20.

Floor 63 is supported by standards 66, and, in turn, supports the wall 65 forming the outer casing of the receiving chamber. An opening 67 in floor 63 communicates with chute 68, which conducts the separated material to any desired point.

Oil receptacles 69, connected by pipes to the parts that need lubrication, operate in the usual and well-understood manner.

The flange surrounding opening 9 in disk 8 flares outwardly and upwardly, and terminates in a depending lip 70 that overlaps a lip 71 that forms the inner wall of hood 72, which tightly encircles pipe 20, but does not rotate therewith, and is supported in position by rods 73, which are attached to the roof portion of wall 65. A plurality of pipes 74 form outlets from the chamber within hood 72, and conduct the liquid that gathers in said chamber, as hereinafter described, to circular pipe 75, which communicates with the main discharge pipe 76, said discharge pipe being governed, in case of need, by cock 77.

The operation of the machine is as follows: Fluid material, such as white lead, cyanid slime, whiting, or the like, is allowed to flow through pipe 24 into pipe 20, and through branch pipes 23 into centrifugal chamber 17. Depending upon the nature of the particular material, pipe 20 and with it branch pipes 23 are simultaneously being rotated by band 30 and the other mechanism described, or other suitable means. The speed of rotation will be greater when the weight of the solid matter contained in the fluid material is less relative to the liquid vehicle than when it is heavier. Thus, the speed will be greater when the fluid material is whiting than when it is white lead. The constant rotation of pipes 23 throws the fluid material well out into chamber 17, which is formed between the disks or shells 7 and 8, which themselves are rotating as rapidly as pipe 20 by reason of the connection of pipe 20 with shaft 1, to which shaft disk 7 is attached so as to rotate therewith, shell 8 being so attached to disk 7 as to rotate therewith but to be adjustable vertically relative thereto. The continued rotation of the disks or shells forming the centrifugal chamber 17 results by reason of centrifugal force in the gradual propulsion of the solid matter which constitutes the weightier constituency of the fluid material fed into the chamber through pipe 20 away from the center of chamber 17 and toward its periphery, where it gradually accumulates, and, by reason of the tapering shape of said chamber around its circumference, acts as a wedge to force the disks or shells 7 and 8 apart, the centrifugal force being constant and operating on the material at the periphery of chamber 17 as well as that near its center, and, in addition, forcing new particles against those closest to the periphery. Thus, the disks or shells 7 and 8, after having been once forced apart, are, during the continued operation of the machine, kept measurably separated so as to form a peripheral opening between same throughout the entire extent of their circumference, said opening, however, being clogged or blocked with the wedgelike mass of solid matter that has been separated from the liquid. Said mass, therefore, prevents the escape from chamber 17 of any liquid, but its outer particles are continuously and gradually discharged through peripheral groove 16 into the chamber formed between bell 64 and wall 65, said discharge being facilitated by the fact that groove 16 flares outwardly. In this connection, it may be observed that while the drawings exhibit the outlet from chamber 17 as being at the periphery of said chamber, yet some portion of the effect obtained by the preferred form of apparatus which is illustrated in the drawings would be obtained if an opening or openings adjacent the periphery of chamber 17 were provided. When the degree of speed is reduced and the centrifugal force decreased, or when the nature of the material treated alters conditions, the amount of space between the edges of disks 7 and 8 will be reduced, partly by the weight of disk 8 and, also, by the force of springs 12 and 14. When the material has been ejected from the peripheral opening of chamber 17 and has fallen into the chamber formed between bell 64 and wall 65, the bottom of the mass rests on floor 63, and is thence removed by the continuous rotation of scrapers 59 and carried to chute 68. As the liquid remains near the center of chamber 17 and accumulates, it naturally flows upward through opening 9 into the chamber within hood 72 and out through pipes 74 into circular pipe 75, and thence escapes, or is conducted, through pipe 76.

I claim:

1. In a centrifugal separator, a pair of disks forming a separating chamber, the lower of the disks having a horizontal top face which forms the floor of the chamber, the upper disk being conical and forming the roof of the chamber, the matter to be separated being adapted to be wedged between said horizontal face and the roof of the chamber and to thereby force the roof and floor of the chamber apart.

2. The combination of a base casting, a central casting thereabove, a U-shaped main frame, braces therefor, arms extending from said braces, idlers mounted on said arms, a main driving shaft, a band operated therefrom and passing over said idlers, a pipe having a pulley thereon driven by said band, a shaft driven by said pipe, a disk mounted on said shaft, a concave disk attached to said first-mentioned disk and forming a centrifugal separating chamber therebetween, said concave disk being adapted to move away from the other disk and thus to form a peripheral discharge for said separating chamber, and having an opening therethrough for the escape of liquid, a liquid receiver having outlets therefrom, a central bell supported by said central casting, a casing surrounding said disks and forming a housing therefor, a floor underlying said bell and said casing, a chute connected with said floor, scraping means for carrying material ejected from said separating chamber into the space between said casing and said bell to said chute, and means for actuating said scraping means.

3. The combination of a central casting, a collar encircling same and having a flange, an annular casting having a flange adapted to overlap said first-mentioned flange to hold said annular casting against downward movement, a rack upon said annular casting, means adapted to engage said rack and rotate said casting, and scraping means borne by said annular casting.

4. In combination with a base, a central drum rigid thereon, a bell disposed over the upper end of said drum and extending downwardly therefrom, a circular bracket secured to said drum below the bell, a casing adapted to rotate about the drum, an overhanging flange and a depending lip carried by the casing to engage said circular bracket, a circumferential rack on said casing, a central shaft, a centrifugal receiver on said shaft above said bell, a receiving chamber composed of a floor, means for supporting said floor and a circumferential side wall extending upwardly from the floor, said floor having an opening therein, and a plurality of scrapers carried by the casing and extending to engage said floor.

5. In combination with a base, a drum carried thereby, a circular bracket secured to the drum, a rotatable casing formed to engage said bracket whereby the casing may rotate but is held against downward movement with respect to the bracket, means to rotate the casing, a shaft, a centrifugal receiver on said shaft, a receiving chamber including a floor, means to support said floor at points substantially in alinement with the casing, scrapers carried by the casing and extending to overlie said floor and to engage same, and means arranged between the receiver and said floor to convey the material discharged from the receiver onto the floor.

6. In combination with a base, a supporting member carried thereby, a circular bracket carried by said supporting member, a casing formed to engage said bracket so as to rotate but be held against downward movement with respect thereto, a receiving chamber composed of a floor surrounding said casing but spaced therefrom, and an upright wall, means to support the floor, a series of scrapers which are secured to the casing and which extend over onto the floor to engage the latter, a centrifugal receiver overlying the floor, and composed of two disks, one of the disks having an opening therethrough and a circular flange which extends above the opening, a downwardly directed lip on the flange, a hood having an inner wall underlying said lip and inclosed thereby, means to conduct liquid from said hood, and means to support the hood from said upright wall of the receiving chamber.

7. In combination with a base and a centrifugal receiver rotatably mounted with respect thereto, a supporting medium extending upwardly from the base, a casing rotatable about said supporting medium, means to rotatably support said casing from said supporting medium, a receiving chamber including a floor which surrounds said casing, scrapers carried by said casing and extending onto the floor, and means to conduct the discharge from said centrifugal receiver to said floor of the receiving chamber.

8. In a centrifugal separator for separating solids from liquids, a pair of rotating disks, the lower of which has a horizontal top face and the upper of which has a conical face, said disks forming a separating chamber which is of narrow-wedge form and which extends from the centers of the disks to the peripheries thereof, whereby the solids when subjected to centrifugal force are formed into a continuous circular wedge form concentric to the periphery of the disks, the solids being thereby compressed and solidified making the discharge of the solids automatic.

In testimony whereof I have affixed my signature in presence of two witnesses.

WILLIAM R. MACKLIND

Witnesses:
D. P. LANDRIGAN,
F. A. VEDINER.